United States Patent
Yamaguchi et al.

(10) Patent No.: US 6,293,972 B1
(45) Date of Patent: *Sep. 25, 2001

(54) PROCESS FOR FLUORINATING CELLULOSIC MATERIALS AND FLUORINATED CELLULOSIC MATERIALS

(75) Inventors: Fumihiko Yamaguchi; Eiji Sakamoto, both of Osaka (JP)

(73) Assignee: Daikin Industries Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,436
(22) PCT Filed: Mar. 28, 1997
(86) PCT No.: PCT/JP97/01061
  § 371 Date: Sep. 29, 1998
  § 102(e) Date: Sep. 29, 1998
(87) PCT Pub. No.: WO97/36934
  PCT Pub. Date: Oct. 9, 1997

(30) Foreign Application Priority Data

Mar. 29, 1996 (JP) .................................................. 8-077041

(51) Int. Cl.[7] .................................................. C08B 15/00
(52) U.S. Cl. ........................ 8/116.1; 8/115.68; 162/9; 162/158; 106/164.01; 106/287.28; 536/56; 536/57; 536/58; 536/72; 536/75
(58) Field of Search ...................... 8/115.51, 116.1, 8/115.68; 162/9, 158; 106/164.01, 287.28; 536/56–58, 72, 75

(56) References Cited

U.S. PATENT DOCUMENTS 3,489,504 * 1/1970 Englert et al. ........................ 8/120
3,799,992 * 3/1974 Pittman et al. ...................... 568/684
5,254,774 * 10/1993 Prokop ................................. 570/138
5,536,304 * 7/1996 Coppens et al. ................... 252/8.57

FOREIGN PATENT DOCUMENTS

| 1095205 | * 5/1955 | (FR) . |
| 60112829 | 6/1985 | (JP) . |
| 6186972A | 5/1986 | (JP) . |
| 61120705A | 6/1986 | (JP) . |
| 61171702A | 8/1986 | (JP) . |
| 62005936 | 1/1987 | (JP) . |
| 02127412 | 5/1990 | (JP) . |

OTHER PUBLICATIONS

Kaehkoba et al., *Cellulose Chem. Technol.,* vol. 16, pp. 615–629 (1982) (w/Abstract) No Month Given.

Matsui et al., *Japanese Mokuzai Gakkai–shi,* vol. 38, No. 1, pp. 73–80 (Jan. 1992) (w/Abstract).

* cited by examiner

*Primary Examiner*—Mark Kopec
*Assistant Examiner*—Brian P. Mruk
(74) *Attorney, Agent, or Firm*—Birch, Stewart, Kolasch & Birch, LLP

(57) ABSTRACT

In the fluorinated cellulosic material obtained by a method for fluorinating a cellulosic material by reacting a cellulosic material selected from the group consisting of cellulose material and lignocellulose material with at least one fluorine-containing compound selected from the group consisting of fluorine-containing olefin compound, fluorine-containing acrylate compound and fluorine-containing methacrylate compound in an organic solvent in the presence of a catalyst, not only the surface but also the inside of the cellulose and/or lignocellulose materials are modified and high performance of the cellulose and/or lignocellulose materials is realized.

8 Claims, No Drawings

PROCESS FOR FLUORINATING CELLULOSIC MATERIALS AND FLUORINATED CELLULOSIC MATERIALS

This application is the national phase under 35 U.S.C. §371 of prior PCT International Application No. PCT/JP97/01061 which has an International filing date of Mar. 28, 1997 which designated the United States of America, the entire contents of which are hereby incorporated by reference.

FIELD OF THE INVENTION

The present invention relates to a method for fluorinating cellulosic material, and a fluorinated cellulosic material.

RELATED ART

A method of obtaining a fluorine-containing cellulose derivative by using a solvent-soluble cellulose derivative has been known (cf. Japanese Patent Kokai Publication No. 171702/1986). This method can not be applied for treating normal wood, cotton cloth, paper and the like. Furthermore, it is not practical because of difficulty in removing HF as by-products generated during the reaction. It has also been known that cellulose is directly reacted with a fluorine-containing compound such as trifluoroacetic acid to obtain a cellulose derivative (cf. Cellulose Chemistry and Technology, 16(6), 615, (1982)). However, according to this reaction, the performance expected by induction of fluorine is not sufficiently exhibited, although a derivative having high substitution degree is obtained.

Wood is a typical lignocellulose material. As the method of imparting water repellency to the wood to enhance the stain proof property, for example, a method of impregnating wood with a fluorine-containing monomer such as heptadecafluoro-decyl acrylate and heating the wood to polymerize the monomer (cf. Japanese Patent Kokai Publication No. 86972/1986), and a method of impregnating wood with a compound having a highly fluorine-containing organic group and heating the wood (cf. Japanese Patent Kokai Publication No. 120705/1986) have been known. However, in any case, since the fluorine-containing compound is expensive and uneconomical and is also a polymer, only the surface of wood is modified and internal modification is not achieved. On the other hand, a method such as a method for surface treatment using a fluorine-containing gas plasma such as tetrafluoromethane (cf. Japanese Mokuzai Gakkai-Shi, Vol. 38, No. 1, pp.73–80, January 1992) has also known. According to this method, the internal modification was slightly achieved, but the fluorine content is poor and the treatment efficiency is inferior.

Also, with respect to cotton cloth, paper or the like as typical cellulose and/or lignocellulose materials, there has well been known an attempt to modify the surface by applying a water- and oil-repellency agent of a polymer of a compound such as acrylate or methacrylate ester having a perfluoroalkyl group, or a copolymer of the above compound and other polymerizable compound such as acrylate ester, maleic anhydride, chloroprene, butadiene, methyl vinyl ketone on the surface of cotton cloth, paper or the like is well known, but internal modification has stilled to be accomplished.

SUMMARY OF THE INVENTION

An object of the present invention is to modify not only the surface but also the inside of cellulose and/or lignocellulose materials, thereby realizing high performance of cellulose and/or lignocellulose materials.

The present invention provides a method for fluorinating a cellulosic material, which comprises reacting the cellulosic material selected from the group consisting of a cellulose material and a lignocellulose material with at least one fluorine-containing compound selected from the group consisting of a fluorine-containing olefin compound, a fluorine-containing acrylate compound and a fluorine-containing methacrylate compound in an organic solvent in the presence of a catalyst.

The present invention also provides a fluorinated cellulosic material obtained by said method for fluorination.

DETAILED DESCRIPTION OF THE INVENTION

The reaction between the cellulose material and/or lignocellulose materials and the fluorine-containing compound is preferably an ionic reaction. In general, an OH group of the cellulose material or lignocellulose material reacts with the fluorine-containing compound. A fluorocarbon group ($R_f$ group or $R_f'$ group in the formulas described hereinafter) is introduced into the cellulosic material by the reaction.

Examples of the cellulose material mainly include natural cellulose such as cotton and hemp; regenerated cellulose such as viscose rayon and cuprammonium rayon. Additional examples of the cellulose material include an ester of an acid having 1 to 20 carbon atoms, such as cellulose acetate and cellulose butyrate; an alkyl ether which may have a substituent having 1 to 6 carbon atoms, such as methyl cellulose, ethyl cellulose and hydroxypropyl cellulose; a cellulose derivative such as nitrocellulose, which is cheap and easily available.

Examples of lignocellulose material mainly include wood, pulp and paper, and any material can be used as a raw material regardless of shape and species of tree.

As the form of wood for the raw material, a wood plate, a thin wood sheet, a lumber, a cylindrical material, a block material, a plywood obtained by processing them, a laminated veneers, a fibrous board, a fibrous mat, a thinning board (wood chip) and a wood flour (particle) can be used.

As the pulp for the raw material, any of mechanical pulp, chemical pulp and semi-chemical pulp can be used. The chemical pulp may be bleached or unbleached one. The shape of the pulp may any shape such as chip, flake, sheet, pulp molding and block, and is not specifically limited.

The paper can also be treated in the shape of a sheet. A cotton-mixed fabric (a woven fabric and a non-woven fabric) or clothing can be used as a raw material of other cellulose material and/or lignocellulose material An organic solvent is preferably an aprotic polar organic solvent. Examples of the organic solvent include acetonitrile, dimethylformamide, dimethylacetamide, dimethyl sulfoxide, hexamethylene phosphoamide, monoglyme, diglyme, triglyme and tetraglyme. Acetonitrile, dimethylformamide and dimethyl sulfoxide are particularly preferable. The amount of the organic solvent may be from 1 to 500 times, e.g. 5 to 200 times the weight of the cellulosic material.

A catalyst is preferably a basic catalyst, particularly a catalyst having no nucleophilicity. An electrophilic catalyst is preferable. The catalyst is preferably a fluoride salt of an alkali metal or alkaline earth metal. Among them, KF, NaF and CsF are exemplified in view of no decomposition and coloring of the cellulose and/or lignocellulose materials. It is particularly preferred to use KF. The catalyst is preferably a dried catalyst having high activity. The amount of the catalyst is preferably from 0.5 to 20 equivalents, particularly from 1 to 5 equivalents, based on 1 equivalent of the —OH group of the cellulose material and/or lignocellulose material.

The fluorine-containing olefin compound includes $R_fCF=CF_2$, $R_fCF=CClF$, $R_fCF=CH_2$, $R_fCH=CH_2$, $R_{f2}C=CF_2$ and $R_{f2}C=CH_2$ and the fluorine-containing acrylate compound includes $R_fOCOCH=CH_2$ and, furthermore, the fluorine-containing methacrylate compound includes $R_fOCOC(CH_3)=CH_2$
wherein $R_f$ is F, Cl, a $C_{1-30}$ polyfluoroalkyl group, a $C_{1-30}$ polyfluoroalkenyl group, a $C_{1-30}$ polyfluoroalkoxy group, or a $C_{2-300}$ polyfluoropolyether group.

$R_f$ may be, for example, a perfluoroalkyl group, a perfluoroalkenyl group, a perfluoroalkoxy group or a perfluoropolyether group.

Specific examples of $R_f$ include the followings:

F—,
Cl—,
$CF_3$—,
$(CF_3)_2CF(CF_2CF_2)_x$—,
$CF_3CF_2(CF_2CF_2)_x$—,
$CF_3O$—,
$(CF_3)_2CF(CF_2CF_2)_xO$—,
$CF_3CF_2(CF_2CF_2)_xO$—,
$H(CF_2CF_2)_yCH_2O$—
wherein x is an integer of 0 to 10, and y is an integer of 1 to 10, $(CF_3)_2CF(CF_2CF_2)_mCH_2CH_2OCH_2CH(OH)CH_2$—,
$CF_3CF_2(CF_2CF_2)_mCH_2CH_2OCH_2CH(OH)CH_2$—,
$H(CF_2CF_2)_1CH_2CH_2OCH_2CH(OH)CH_2$—,
$(CF_3)_2CF(CF_2CF_2)_mCH_2CH(OH)CH_2$—,
$CF_3CF_2(CF_2CF_2)_mCH_2CH(OH)CH_2$—,
$(CF_3)_2CF(CF_2CF_2)_mCH_2CH_2$—,
$CF_3CF_2(CF_2CF_2)_mCH_2CH_2$—,
$H(CF_2CF_2)_1CH_2$—
wherein m is an integer of 0 to 10, and 1 is an integer of 1 to 10, $(CF_3)_2CF(CF_2CF_2)_mCH_2CH_2OCH_2CH(OH)CH_2O$—,
$CF_3CF_2(CF_2CF_2)_mCH_2CH_2OCH_2CH(OH)CH_2O$—,
$H(CF_2CF_2)_1CH_2CH_2OCH_2CH(OH)CH_2O$—,
$(CF_3)_2CF(CF_2CF_2)_mCH_2CH(OH)CH_2O$—,
$CF_3CF_2(CF_2CF_2)_mCH_2CH(OH)CH_2O$—,
$(CF_3)_2CF(CF_2CF_2)_mCH_2CH_2O$—,
$CF_3CF_2(CF_2CF_2)_mCH_2CH_2O$—,
$H(CF_2CF_2)_1CH_2O$—
wherein m is an integer of 0 to 10, and 1 is an integer of 1 to 10, $HCF_2CF_2$—,
$HCClFCF_2$—,
$HCF_2CClF$—,
$CF_3CFHCF_2$—,
$CF_3CF=CF$—,
$CF_2=CFCF_2$—,
$CH_3CF_2$—,
$CF_3CH_2$—,
$(CF_3)_2CHCF_2$—,
$HOC(CF_3)_2$—,
$Cl(CF_2CClF)_iCFHCClF$—
wherein i is an integer of 1 to 10, $(CF_3)_2CFCFHC(F)(CF_3)$—,
$(CF_3)_2CFC(F)(CFHCF_3)$—,
$(CF_3)_2C(CFHCF_2CF_3)$—,
$(CF_3)_2CHC(F)(CF_2CF3)$—,
$(CF_3)_2CFC(F)[C(CF_3)(H)CF_2CF_2CF_3]$—,
$(CF_3)_2CFCFHC(CF_3)(CF_2CF_2CF_3)$—,
$[(CF_3)_2CF]_2C(CFHCF_3)$—,
$[(CF_3)_2CF]CHC(F)(CF_3)$—,
$(CF_3)_2CFCF=C(CF_3)$—,
$(CF_3)_2CFC(=CFCF_3)$—,
$(CF_3)_2C(CF=CFCF_3)$—,
$(CF_3)_2C=CFC(F)CF_3$—,
$(CF_3)_2CFC(F)(CF=CF_2)$—,
$CF_2=C(CF_3)C(F)(CF_2CF_3)$—,
$(CF_3)_2C=C(CF_2CF_3)$—,
$(CF_3)_2CFC[=C(CF_3)CF_2CF2CF_3]$—,
$(CF_3)_2C=CFC(CF_3)(CF_2CF_2CF_3)$—,
$(CF_3)_2CFC(F)[C(CF_3)=CFCF_2CF3]$—,
$[(CF_3)_2CF]_2C(CF=CF_2)$—,
$[(CF_3)_2CF]_2C=C(CF_3)$—,
$(CF_3)_2C=C[CF(CF_3)_2]C(F)(CF_3)$—,
$HCF_2CF_2O$—,
$HCClFCF_2O$—,
$HCF_2CClFO$—,
$CF_3CFHCF_2O$—,
$CH_3CF_2O$—,
$CF_3CH_2O$—,
$R(CF_2CF_2CF_2O)_a(CFHCF_2CF_2O)_b(CH_2CF_2CF_2O)_c(CCl_2CF_2CF_2O)_d(CClFCF_2—CF_2O)_e$—$R^2$—, and
$R^1(CF (CF_3)CF_2O)_f(CF_2CF_2O)_g(CF_2O)_h$—$R^2$—
wherein a, b, c, d, e, f, g and h are respectively an integer of 0 to 100, which are not 0 at the same time; R and $R^1$ are respectively hydrogen, halogen or an alkoxy group having 1 to 3 carbon atoms, which may be partly or totally fluorinated; and $R^2$ is a divalent organic group having 1 to 5 carbon atoms, e.g. a divalent alkyl group, a divalent alkenyl group, a divalent alkyl ether group, a divalent alkyl alcohol group or the like, which may be partly or totally fluorinated.

Examples of the fluorine-containing olefin compound include $R_f'[CF=CF_2]_n$, $R_f'[CF=CClF]_n$, $R_f'[CF=CH_2]_n$, $R_f'[CH=CH_2]_n$, $R_f'[CF=CF_2]_n$, $R_f'[CF=CClF]_n$ and $R_f'[CF=CH_2]_n$, examples of the fluorine-containing acrylate compound include $R_f'[OCOCH=CH_2]_n$, and examples of the fluorine-containing methacrylate compound include $R_f'[OCOC(CH_3)=CH_2]_n$
wherein n is an integer of 2 to 4, and $R_f'$ is a $C_{1-30}$ organic polyfluoro group or a $C_{2-300}$ polyfluoropolyether group. It is also possible to attempt to improve the strength of the cellulosic material by the crosslinking reaction between these polyvalent olefin compounds and OH groups of the cellulosic materials.

For example, the fluorine-containing olefin compound may be $R_f'[CF=CF_2]_2$, $R_f'[CF=CClF]_2$, $R_f'[CF=CH_2]_2$, $R_f'[CH=CH_2]_2$, $R_f'[CF=CF_2]_2$, $R_f'[CF=CClF]_2$, $R_f'[CF=CH_2]_2$ or the like and the fluorine-containing acrylate compound may be $R_f'[OCOCH=CH_2]_2$ or the like and, furthermore, the fluorine-containing methacrylate compound may be $R_f'[OCOC(CH_3)=CH_2]_2$ or the like wherein $R_f'$ is as defined above.

$R_f'$ may be, for example, a perfluoro group.
Specific examples of $R_f'$ include the followings:

—$(CF_2CF_2)_j$—,
—$(CFClCF_2)_j$—,
—$(CFHCF_2)_j$—, and
—$(CH_2CF_2)_j$—
wherein j is an integer of 1 to 15,
—$R^3(CF_2CF_2CF_2O)_a(CFHCF_2CF_2O)_b(CH_2CF_2CF_2O)_c$ $(CCl_2CF_2CF_2O)_d(CCl-CF_2CF_2O)_e$—$R^2$—,
—$R^4(CF(CF_3)CF_2O)_f(CF_2CF_2O)_g(CF_2O)_h$—$R^2$—
wherein a, b, c, d, e, f, g and h are respectively an integer of 0 to 100, which are not 0 at the same time; and $R^2$, $R^3$ and $R_4$ are respectively a divalent organic group having 1 to 5 carbon atoms, e.g. a divalent alkyl group, a divalent alkenyl group, a divalent alkyl ether group, a divalent alkyl alcohol group or the like, which may be partly or totally fluorinated,

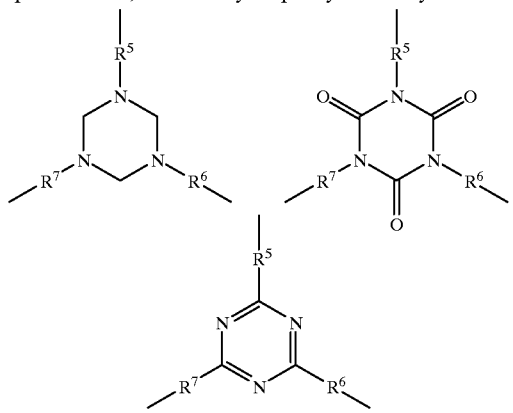

wherein $R^5$, $R^6$ and $R^7$ are respectively a divalent organic group having 1 to 5 carbon atoms, e.g. a divalent alkyl group, a divalent alkenyl group, a divalent alkyl ether group, a divalent alkyl alcohol group or the like, which may be partly or totally fluorinated.

The amount of the fluorine-containing compound may be 0.1 to 50 equivalents, e.g. 5 to 20 equivalents, per 1 equivalent of the OH group of the cellulosic materials.

With respect to the reaction condition, the reaction pressure is preferably from 0 to 100 kg/cm$^2$G and the reaction temperature is preferably from 0 to 150° C. The reaction time is usually from 1 to 120 hours.

Since the reaction of the present invention can be performed even in case of the heterogeneous system, it is not necessary to conduct a chemical modification (e.g. esterification) of the cellulose and/or lignocellulose material to dissolve in the solvent.

The cellulosic material thus obtained is superior in water repellency, oil repellency, stain proof property, rotproof property, mothproof property, weathering resistance, chemical resistance, oil resistance, heat resistance, dimensional stability, strength or the like, and is a novel cellulosic material wherein not only the surface but also the inside are fluorinated, thereby imparting high performance.

Fabricated articles using this novel cellulosic material, and their required characteristics are as shown in Table A.

○: Required characteristics

—: Characteristics which are not required

TABLE A

| | Required properties | | | | | | |
|---|---|---|---|---|---|---|---|
| Fabricated articles | Water resistance | Dimensional stability | Stainproof property | Weatherability | Durability | Rotproof property | Moth-, fungi- and bacillus-proof properties |
| Wood facing material | ○ | ○ | ○ | ○ | ○ | — | — |
| Wood structural material | ○ | ○ | ○ | ○ | ○ | ○ | ○ |
| Laminated building material | ○ | ○ | ○ | ○ | ○ | ○ | ○ |
| Wood tile | ○ | ○ | ○ | ○ | ○ | ○ | ○ |
| Directional wood leaf laminated lumber | — | ○ | — | — | — | ○ | ○ |
| Particle board | ○ | — | — | — | — | ○ | ○ |
| Wood fiber material | ○ | ○ | — | ○ | ○ | ○ | ○ |
| Composite material with metal | ○ | ○ | ○ | — | ○ | — | — |
| Building material for water section | ○ | ○ | ○ | — | ○ | ○ | ○ |
| Fungiproofing wood material | — | — | — | — | — | — | ○ |
| Non-fogging resin molded article | ○ | — | — | — | — | — | — |
| Column | ○ | ○ | ○ | ○ | ○ | ○ | ○ |
| Foundation | ○ | ○ | ○ | ○ | ○ | ○ | ○ |
| Bracing | ○ | ○ | ○ | ○ | ○ | ○ | ○ |
| Joist | ○ | ○ | ○ | ○ | ○ | ○ | ○ |
| Inner wall of house | ○ | ○ | ○ | — | ○ | — | — |
| Room divider | ○ | ○ | ○ | — | ○ | — | — |
| Door | ○ | ○ | ○ | — | ○ | — | — |
| Shelf | ○ | ○ | ○ | — | ○ | — | — |
| Furniture | ○ | ○ | ○ | — | ○ | ○ | ○ |
| Cabinet | ○ | ○ | ○ | — | ○ | — | — |
| Floor | ○ | ○ | ○ | — | ○ | ○ | ○ |
| Ceiling | ○ | ○ | ○ | — | ○ | ○ | ○ |
| Deadening material | — | — | — | — | ○ | — | — |
| Insulating material | — | — | — | — | ○ | — | — |
| Wall tile | ○ | ○ | ○ | — | ○ | — | ○ |

TABLE A-continued

| | Required properties | | | | | | |
|---|---|---|---|---|---|---|---|
| Fabricated articles | Water resistance | Dimensional stability | Stainproof property | Weatherability | Durability | Rotproof property | Moth-, fungi- and bacillus-proof properties |
| Wallpaper | o | — | o | — | o | — | — |
| Footstep | o | o | o | — | o | — | — |
| Grab rail | o | o | o | — | o | — | — |
| Screen door | o | o | o | o | o | o | o |
| Fireproofing door | o | o | o | o | o | o | o |
| Entrance door | o | o | — | — | o | — | — |
| Bench | o | o | o | o | o | o | o |
| Outdoors chair | o | o | o | o | o | o | o |
| Field stand | o | o | o | o | o | o | o |
| House exterior article | o | o | o | o | o | o | o |
| Bathtub | o | o | o | — | o | o | o |
| Divider in shower room | o | o | o | — | o | o | o |
| Water section | o | o | o | — | o | o | o |
| Floating structure | o | o | o | o | o | o | o |
| Dashboard | o | o | o | o | o | — | — |
| Mailing tube | o | o | — | — | o | o | o |
| Packaging tube | o | o | — | — | o | o | o |
| Pallet | o | o | — | — | o | o | o |
| Corner protector | o | o | — | o | o | o | o |
| Support (for solar battery) | o | o | — | — | o | o | o |
| Printed circuit board | o | o | o | — | o | — | — |
| Open veranda | o | o | o | o | o | o | o |
| Moldboard | o | o | — | o | o | o | o |
| Grip of instrument | o | o | o | — | o | o | o |
| Jewel box | o | o | o | — | o | o | o |
| Musical instrument | o | o | o | — | o | o | o |
| Appliance and sounder | o | o | o | — | o | o | o |
| Toy | o | o | o | — | o | — | — |
| Baseball bat | o | — | — | — | o | o | o |
| Archery | o | o | o | o | o | o | o |
| Sailboat | o | o | o | o | o | o | o |
| Wood club head | o | o | — | — | o | o | o |
| Friction material for auto-transmission | | o | — | — | o | — | — |
| Windscreen | o | o | — | o | o | — | — |
| Goggle | o | — | — | — | — | — | — |
| Wrapper | o | — | o | — | — | — | — |
| Case for hand baggage | o | o | o | — | o | — | — |
| Cutting board | o | — | o | — | o | o | o |
| Grating | o | — | — | — | o | o | o |
| Mouse pad | — | — | o | — | o | — | — |
| Pet house | o | o | o | o | o | o | o |
| Large plaything in park | o | o | o | o | o | o | o |
| Wood bridge | o | o | o | o | o | o | o |
| Landing stage | o | o | o | o | o | o | o |
| Polarized light film | o | o | o | — | o | — | — |
| Cotton | o | o | o | — | o | o | o |
| Cotton yarn | o | o | o | — | o | o | o |
| Cotton fabric | o | o | o | — | o | o | o |
| Knitted fabric | o | o | o | — | o | o | o |
| Clothes sewed articles | o | o | o | — | o | o | o |
| Carpet | o | o | o | — | o | o | o |
| Non-woven fabric | o | o | o | — | o | o | o |
| Fish net | o | o | o | — | o | o | o |
| Narrow-width fabric | o | o | o | — | o | o | o |
| Plaited vinculum | o | o | o | — | o | o | o |
| Lace fabric | o | o | o | — | o | o | o |
| Refined cotton | o | — | o | — | o | o | o |
| Futon (bedding) | o | o | o | — | o | o | o |
| Cushion | o | o | o | — | o | o | o |
| Split shop curtain | o | o | o | — | o | — | — |
| Tab | o | o | o | — | o | — | — |
| Standing placard | o | o | o | — | o | — | — |
| Curtain | o | o | o | — | o | — | — |
| Jacket | o | o | o | — | o | — | o |
| Uniform | o | o | o | — | o | — | o |
| Pants | o | o | o | — | o | — | o |
| Skirt | o | o | o | — | o | — | o |
| Dress shirt | o | o | o | — | o | — | o |
| Polo shirt | o | o | o | — | o | — | o |

TABLE A-continued

| Fabricated articles | Water resistance | Dimensional stability | Stainproof property | Weatherability | Durability | Rotproof property | Moth-, fungi- and bacillus-proof properties |
|---|---|---|---|---|---|---|---|
| Blouse | ○ | ○ | ○ | — | ○ | — | ○ |
| Apron | ○ | ○ | ○ | — | ○ | — | ○ |
| Sleeved Japanese apron | ○ | ○ | ○ | — | ○ | — | ○ |
| Desk work dress | ○ | ○ | ○ | — | ○ | — | ○ |
| Fatigue suit | ○ | ○ | ○ | — | ○ | — | ○ |
| Bed dress | ○ | ○ | ○ | — | ○ | — | — |
| Socks | ○ | ○ | ○ | — | ○ | — | — |
| Tabi (Japanese socks) | ○ | ○ | ○ | — | ○ | — | — |
| Glove | ○ | ○ | ○ | — | ○ | — | — |
| Futon case | ○ | ○ | ○ | — | ○ | — | — |
| Cushion case | ○ | ○ | ○ | — | ○ | — | — |
| Pillowcase | ○ | ○ | ○ | — | ○ | — | — |
| Tablecloth | ○ | ○ | ○ | — | ○ | — | — |
| Furoshiki (Wrapping cloth) | ○ | ○ | ○ | — | ○ | — | — |
| Paper | ○ | ○ | ○ | — | ○ | — | — |
| Paperboard | ○ | ○ | — | — | ○ | — | — |
| Film | ○ | ○ | ○ | ○ | ○ | — | — |
| Synthetic paper | ○ | ○ | ○ | — | ○ | — | — |
| Oil-resistant paper | ○ | — | ○ | — | ○ | — | — |
| Coated paper for print | ○ | ○ | ○ | ○ | ○ | ○ | — |
| Information relating paper | ○ | ○ | ○ | — | ○ | ○ | — |
| Wrapping converted paper | ○ | ○ | ○ | ○ | ○ | ○ | — |
| Industrial converted paper | ○ | ○ | ○ | ○ | ○ | ○ | — |
| Household converted paper | ○ | ○ | ○ | — | ○ | ○ | — |
| Art paper | ○ | ○ | ○ | ○ | ○ | — | — |
| Coat paper | ○ | ○ | ○ | ○ | ○ | — | — |
| Copying paper | ○ | ○ | ○ | ○ | ○ | — | — |
| Recording paper | ○ | ○ | ○ | ○ | ○ | — | — |
| Corrugated board | ○ | ○ | ○ | ○ | ○ | — | — |
| Individual packaging and inner packaging carton | ○ | ○ | ○ | — | ○ | — | — |
| Food carton | ○ | ○ | ○ | — | ○ | — | — |
| Paper bag | ○ | ○ | ○ | — | ○ | — | — |
| Facial tissue | ○ | ○ | ○ | — | ○ | — | — |
| Electrically insulating paper | ○ | ○ | ○ | — | ○ | — | — |
| Release paper | ○ | ○ | ○ | — | ○ | — | — |
| Adhesive paper | ○ | ○ | ○ | — | ○ | — | — |
| Poster | ○ | ○ | ○ | ○ | ○ | — | — |
| Sticker | ○ | ○ | ○ | ○ | ○ | — | — |
| Catalog | — | — | ○ | — | ○ | — | — |
| Brochure | — | — | ○ | — | ○ | — | — |
| Calendar | — | — | ○ | — | ○ | — | — |
| Map | ○ | ○ | ○ | ○ | ○ | — | — |
| Book | — | ○ | ○ | ○ | ○ | — | — |
| Telephone book | — | ○ | ○ | — | ○ | — | — |
| Baggage tag | ○ | ○ | ○ | ○ | ○ | — | — |
| Golf scorecard | ○ | ○ | ○ | — | ○ | — | — |
| Food label | ○ | ○ | ○ | — | ○ | — | — |
| Pulp | ○ | ○ | ○ | — | ○ | — | — |
| Pulp processing article | ○ | ○ | ○ | — | ○ | — | — |
| Shipping cushioning medium | ○ | ○ | ○ | — | ○ | — | — |
| Pad for shape retention | ○ | ○ | ○ | — | ○ | — | — |
| Fresh food prepackaging tray | ○ | ○ | ○ | — | ○ | — | — |
| Egg shipping tray | ○ | ○ | ○ | — | ○ | — | — |
| Gift inner packaging cushioning medium | ○ | ○ | ○ | — | ○ | — | — |

PREFERRED EMBODIMENTS OF THE INVENTION

The following Examples further illustrate the present invention in detail.

In the Examples, tests were conducted in the following manner.

(1) Contact Angle

A contact angle for water (Examples 1 to 7, Comparative examples 1 and 2, untreated cotton cloth and wood chip) and that for liquid paraffin (Examples 1 to 4, Comparative example 1 and untreated cotton cloth) were measured by using a contact angle meter (manufactured by Kyowa Kaimen Kagaku Co., Ltd., Model: CA-A).

(2) Water Content

After a measurement sample was previously dried at 100° C. for 1 hour, the weight of the measurement sample before containing water was measured. After the measurement sample was immersed in the aqueous phase for 10 minutes, the sample was removed from the aqueous phase and water was sufficiently removed by air drying for 5 minutes. Then, the weight of the measurement sample after containing water was measured. Then, the weight of the measurement sample after containing water, the weight of the measurement sample before containing water and the amount of water contained in the measurement sample were determined, respectively, and the water content was calculated by the following equation: Water content=(Amount of water contained)/(weight of the measurement sample before containing water).

(3) Stainproof Property

The measurement sample was allowed to stand in a kitchen for 1 month and was visually evaluated.

(4) Weathering Resistance

The measurement sample was allowed to stand outdoors for 1 month and visually evaluated.

(5) Fungiproof Property

The measurement sample was allowed to stand outdoors for 9 months and visually evaluated.

(6) Breaking Strength

Using Tensilon 500 kgf (manufactured by Orientic Corporation), the breaking strength was measured.

EXAMPLE 1

A cotton cloth (a woven fabric made of yarn having a gauge of 40) (2 cm×2 cm) (0.59 g, 3.64×10$^{-3}$ mol) as a raw cellulose material, driedKF (Krocat-F, manufactured by Morita Kagaku Co., Ltd.) (0.845 g, 1.3 equivalents per 1 equivalent of OH group of the cellulose material) and 50 ml of acetonitrile were charged in a 100 ml autoclave. After the autoclave was cooled to 0° C. under a nitrogen atmosphere, 16 g of hexafluoropropene (10 equivalents per 1 equivalent of OH group of the cellulose material) was gradually introduced. After the completion of the introduction of hexafluoropropene, the autoclave was once heated to 50° C. It was confirmed that rapid heat evolution did not occur, and then the autoclave was heated to 80° C. and the reaction was conducted for 1 hour. After the completion of the reaction, the sample was washed six times with purified water and HCFC-141b, respectively, and air-dried for 24 hours.

The contact angle, water content and stain proof property of the resultant sample were evaluated. The results are shown in Tables 1 and 3.

EXAMPLES 2 and 3

Except that 50 ml of dimethyl sulfoxide (Example 2) and 50 ml of dimethylformamide (Example 3) were used instead of acetonitrile as the solvent, the same procedure as in Example 1 was repeated. The results are shown in Tables 1 and 3.

EXAMPLE 4

Except that 50 ml of dimethylformamide instead of acetonitrile as the solvent and 63 g of polyfluoroalkyl acrylate [$CF_3CF_2(CF_2CF_2)_nCH_2CH_2OCOCH=CH_2$, n is an integer of 3 to 10] instead of hexafluoropropene as the fluorine-containing compound was used and the reaction was conducted at the reaction temperature of 120° C. for the reaction time of 30 hours, the same procedure as in Example 1 was repeated. The results are shown in Tables 1 and 3.

COMPARATIVE EXAMPLE 1

After the same cotton cloth (2×2 cm) as that used in Example 1 was immersed in water- and oil-repellency agent Unidine TG-410 (manufactured by Daikin Industries Ltd.) at 20° C. over 30 minutes, it was removed (wet pick up: 238% by weight) and dried at 100° C. for 3 minutes.

The contact angle, water content and stainproof property of the resultant sample were evaluated. The results are shown in Tables 1 to 3.

EXAMPLE 5

Wood chip (Douglas fir, size of 2 cm×1 cm×0.6 cm) (0.59 g, 3.64×10$^{-3}$ mol) as a lignocellulose material of a rawmaterial, dried KF (Krocat-F, manufactured by Morita Kagaku Co., Ltd.) (0.845 g, 1.3 equivalents per 1 equivalent of OH group of the cellulosic material) and 50 ml of acetonitrile were charged in a 100 ml autoclave. After the autoclave was cooled to 0° C. under a nitrogen atmosphere, 16 g of hexafluoropropene (10 equivalents per 1 equivalent of OH group of the cellulosic material) was gradually introduced. After the completion of the introduction of hexafluoropropene, the autoclave was once heated to 50° C. It was confirmed that rapid heat evolution did not occur, and then the autoclave was heated to 80° C. and the reaction was conducted for 1 hour. After the completion of the reaction, the sample was washed six times with purified water and HCFC-141b, respectively, and air-dried for 24 hours.

The contact angle, water content and stainproof property, weatherability and fungiproof property of the resultant sample were evaluated. The results are shown in Tables 2 to 5.

EXAMPLE 6

Except that 11 g of tetrafluoroethylene was used instead of hexafluoropropene as the fluorine-containing compound, the same procedure as in Example 5 was repeated. The results are shown in Tables 2 to 5.

EXAMPLE 7

Except that 50 ml of dimethylformamide instead of acetonitrile as the solvent and 63 g of polyfluoroalkyl acrylate [$CF_3CF_2(CF_2CF_2)_nCH_2CH_2OCOCH=CH_2$, n is an integer of 3 to 10] instead of hexafluoropropene as the fluorine-containing compound were used and the reaction was conducted at the reaction temperature of 120° C. for the reaction time of 30 hours, the same procedure as in Example 5 was repeated. The results are shown in Tables 2 to 5.

EXAMPLE 8

Except that NaF (0.612 g) was used instead of KF as the catalyst, the same procedure as in Example 5 was repeated. The results are shown in Tables 2 to 5.

COMPARATIVE EXAMPLE 2

After 0.10 g of the same wood chip as that used in Example 5 was immersed in water- and oil-repellency agent Unidine TG-410 (manufactured by Daikin Industries Ltd.) at 20° C. over 30 minutes, it was removed (wet pick up: 168% by weight) and dried at 100° C. for 3 minutes.

The contact angle, water content, stainproof property, weathering resistance and fungiproof property of the resultant sample were evaluated. The results are shown in Tables 2 to 5.

TABLE 1

| | Cellulose material | Catalyst | Solvent | Fluorine-containing olefin compound | Contact angle (°) Water | Contact angle (°) Liquid paraffin | Water content g (water)/g (cotton cloth) |
|---|---|---|---|---|---|---|---|
| Example 1 | Cotton cloth | KF | Acetonitrile | Hexafluoropropene | 131 | Δ[3] | 0.125 |
| Example 2 | Cotton cloth | KF | Dimethyl sulfoxide | Hexafluoropropene | 143 | 106 | 0.000 |
| Example 3 | Cotton cloth | KF | Dimethylformamide | Hexafluoropropene | 139 | 106 | 0.019 |
| Example 4 | Cotton cloth | KF | Dimethylformamide | Polyfluoroalkyl acrylate[4] | 128 | Δ | 0.230 |
| Comparative Example 1[1] | Cotton cloth | — | — | — | 125 | 130 | 0.267 |
| Untreated | Cotton cloth | — | — | — | x[2] | x | 0.960 |

[1] Treated with TG-410 (a water- and oil-repellency agent manufactured by Daikin Industries Ltd.)
[2] x: instantly immersed
[3] Δ: immersed with a lapse of time
[4] Structural formula: $CF_3CF_2(CF_2CF_2)_nCH_2CH_2OCOCH=CH_2$ (n is an integer of 3 to 10)

TABLE 2

| | Lignocellulose material | Catalyst | Solvent | Fluorine-containing olefin compound | Contact angle (°) Water | Water content g (water)/g (wood chip) |
|---|---|---|---|---|---|---|
| Example 5 | Wood chip | KF | Acetonitrile | Hexafluoropropene | 128 | 0.186 |
| Example 6 | Wood chip | KF | Acetonitrile | Tetrafluoroethylene | 87 | 0.215 |
| Example 7 | Wood chip | KF | Dimethylformamide | Polyfluoroalkyl acrylate[2] | 127 | 0.210 |
| Example 8 | Wood chip | NaF | Acetonitrile | Hexafluoropropene | 91 | 0.202 |
| Comparative Example 2[1] | Wood chip | — | — | — | 125 | 0.220 |
| Untreated | Wood chip | — | — | — | 86 | 0.434 |

[1] Treated with TG-410 (a water- and oil-repellency agent manufactured by Daikin Industries Ltd.)
[2] Structural formula: $CF_3CF_2(CF_2CF_2)_nCH_2CH_2OCOCH=CH_2$ (n is an integer of 3 to 10)

TABLE 3

| | Stainproof property |
|---|---|
| Example 1 | ○ |
| Example 2 | ○ |
| Example 3 | ○ |
| Example 4 | ○ |
| Example 5 | ○ |
| Example 6 | ○ |
| Example 7 | ○ |
| Example 8 | ○ |
| Comparative Example 1 | ○ |
| Comparative Example 2 | Δ |
| Untreated | x |

Evaluation
○: Oil stain was not observed.
Δ: Oil stain was slightly observed.
x: Oil stain was observed.

TABLE 4

| | Weathering resistance |
|---|---|
| Example 5 | ○ |
| Example 6 | ○ |
| Example 7 | ○ |
| Example 8 | ○ |
| Comparative Example 2 | Δ |
| Untreated | x |

Evaluation
○: Browning was not observed.
Δ: Browning was slightly observed.
x: Browning was observed.

TABLE 5

| | Fungiproof property |
|---|---|
| Example 5 | ○ |
| Example 6 | ○ |
| Example 7 | ○ |
| Example 8 | ○ |

TABLE 5-continued

|  | Fungiproof property |
|---|---|
| Comparative Example 2 | x |
| Untreated | x |

Evaluation
o: Fungi was not observed.
x: Fungi was observed.

EXAMPLE 9

Except that 29 g of perfluoro-1,5-hexadiene [$CF_2$=$CFCF_2$—$CF_2CF$=$CF_2$] was used instead of hexafluoropropene as the fluorine-containing compound, the same procedure as in Example 5 was repeated. Then, the breaking strength of the resultant sample was measured. The results are shown in Table 6.

TABLE 6

|  | Breaking strength (kgf/cm$^2$) |
|---|---|
| Example 9 | 50 |
| Untreated | 40 |

EFFECT OF THE INVENTION

According to the present invention, by reacting a cellulose material and/or a lignocellulose material with at least one fluorine-containing compound selected from the group consisting of fluorine-containing olefin compound, fluorine-containing acrylate compound and fluorine-containing methacrylate compound, not only the surface but also the inside of the cellulose and/or lignocellulose materials are modified, thereby making it possible to produce a novel cellulosic material, which is superior in water repellency, oil repellency, stainproof property, rotproof property, mothproof property, weathering resistance, oil resistance, chemical resistance, heat resistance, dimensional stability, strength or the like.

What is claimed is:

1. A method for fluorinating a cellulosic material, which comprises reacting a cellulosic material selected from the group consisting of a cellulosic material and a lignocellulose material with at least one fluorine-containing compound selected from the group consisting of a fluorine-containing olefin compound, a fluorine-containing acrylate compound and a fluorine-containing methacrylate compound in an aprotic polar organic solvent in the presence of a catalyst.

2. The method according to claim 1, wherein the cellulosic material is a cellulose material selected from the group consisting of natural cellulose and regenerated cellulose.

3. The method according to claim 1, wherein the cellulosic material is a lignocellulose material selected from the group consisting of wood, pulp and paper.

4. The method according to claim 1, wherein the catalyst is a basic catalyst.

5. The method according to claim 1, wherein the catalyst is a fluoride salt of an alkali metal or alkaline earth metal.

6. The method according to claim 1, wherein the catalyst is potassium fluoride.

7. The method according to claim 1, wherein the fluorine-containing olefin compound is $R_fCF$=$CF_2$, $R_fCF$=$CClF$, $R_fCF$=$CH_2$, $R_fCH$=$CH_2$, $R_{f2}C$=$CF_2$ or $R_{f2}C$=$CH_2$, the fluorine-containing acrylate compound is $R_fOCOCH$=$CH_2$, and the fluorine-containing methacrylate compound is $R_fOCOC(CH_3)$=$CH_2$ wherein $R_f$ is F, Cl, a $C_{1-30}$ polyfluoroalkyl group, a $C_{1-30}$ polyfluoroalkenyl group, a $C_{1-30}$ polyfluoroalkoxy group, or a $C_{2-300}$ polyfluoropolyether group.

8. The method according to claim 1, wherein the fluorine-containing olefin compound is $R_f'[CF$=$CF_2]_n$, $R_f'[CF$=$CClF]_n$, $R_f'[CF$=$CH_2]_n$, $R_f'[CH$=$CH_2]_n$, $R_f'[CF$=$CF_2]_n$, $R_f'[CF$=$CClF]_n$ or $R_f'[CF$=$CH_2]_n$, the fluorine-containing acrylate compound is $R_f'[OCOCH$=$CH_2]_n$, and the fluorine-containing methacrylate compound is $R_f'[OCOC(CH_3)$=$CH_2]_n$ wherein n is an integer of 2 to 4; and $R_f'$ is a $C_{1-30}$ organic polyfluoro group or a $C_{2-300}$ polyfluoropolyether group.

\* \* \* \* \*